March 21, 1944.     L. S. SNYDER     2,344,568
STARTER CIRCUIT FOR MOTOR VEHICLES
Filed May 3, 1943
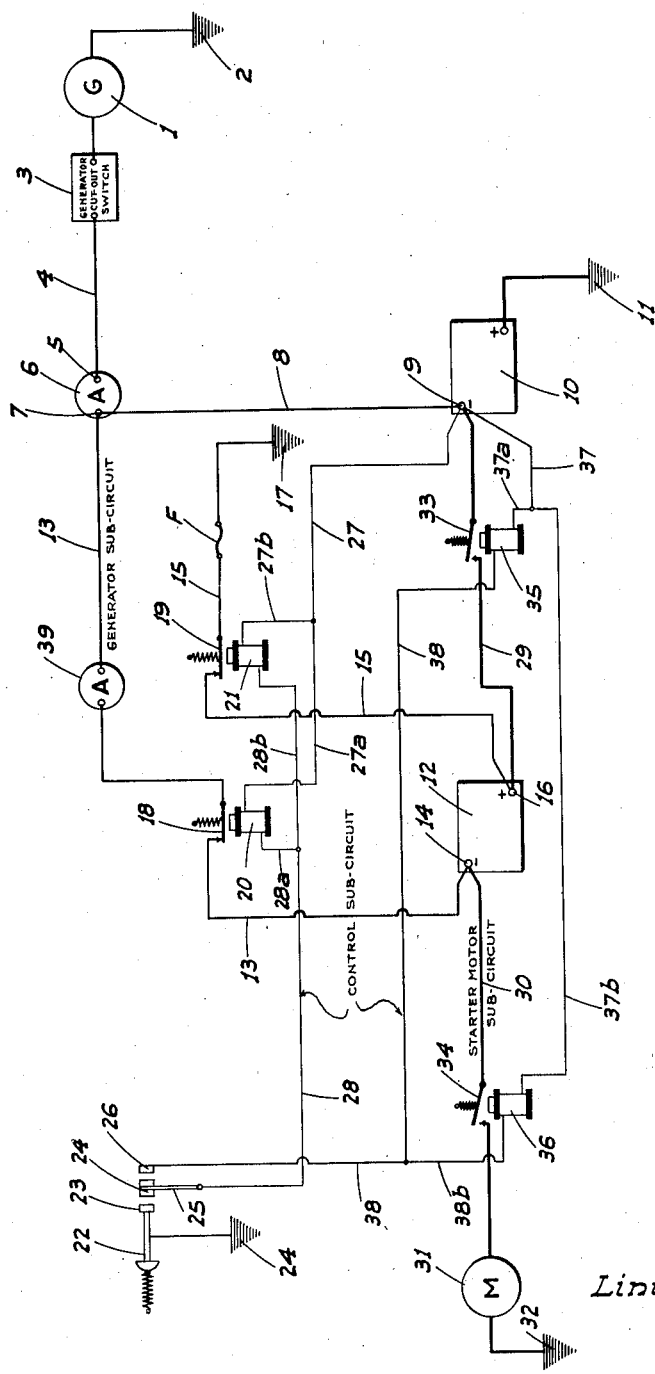
Inventor
Linus S. Snyder
By
Webster & Webster
Attorney Patented Mar. 21, 1944

2,344,568

UNITED STATES PATENT OFFICE 2,344,568

STARTER CIRCUIT FOR MOTOR VEHICLES

Linus S. Snyder, Manteca, Calif.

Application May 3, 1943, Serial No. 485,445

7 Claims. (Cl. 290—38)

This invention relates to, and it is an object to provide, an improved starter circuit for motor vehicles, and especially trucks.

At present many commercial vehicles, such as trucks or the like, are difficult to start under certain conditions, as for example when the fuel system of the vehicle is converted for use with "butane." Such difficulty in starting places an undue load on the conventional 6 v. storage battery with which most of such vehicles are initially equipped. To overcome this problem, this invention has for an object the mounting of an additional 6 v. storage battery on the vehicle, and, through the medium of my novel circuit, the connection of such two batteries so that manual closing of a starting switch causes connection of said batteries in series in a starter motor sub-circuit whereby to supply 12 v. of electrical energy to the starter motor and prevent overloading of the battery system by a hard starting engine; and opening of the starting switch causes the opening of said starter motor sub-circuit and the connection of said batteries in parallel in a general sub-circuit, whereby said batteries are charged at an even rate during operation of the vehicle.

It is an additional object of this invention to provide a starter circuit for motor vehicles, as in the preceding paragraph, which includes relays, operative upon closing of the starting switch, to first break the parallel connection of the storage batteries in the generator sub-circuit (said generator sub-circuit being automatically opened by a conventional generator cut-out switch when the engine is stopped), and to subsequently connect both of said batteries in series in the starter motor sub-circuit; one set of relays functioning to produce the first result, and another set of relays functioning to produce the subsequent result.

A still further object of the invention is to provide a starter circuit for a motor vehicle which includes two storage batteries, a generator, and a starter motor, said circuit comprising a generator sub-circuit connecting said batteries in parallel relative to the generator, a normally open starter motor sub-circuit connecting said batteries in series relative to the starter motor, and a control sub-circuit including a manually operated control switch unit, said control sub-circuit being operative upon closing of said control switch unit to first break the parallel connection of said batteries in the generator sub-circuit, and to subsequently close the starter motor sub-circuit. This order or sequence of control of the above named sub-circuits is quite important, for the reason as will hereinafter appear.

A further object of the invention is to provide a simple and inexpensive starter circuit for motor vehicles, and yet one which will be exceedingly effective for the purpose for which it is designed.

These objects I accomplish by means of such structure and relative arrangement of parts as will fully appear by a perusal of the following specification and claims.

The figure of the drawing is a diagram of my improved starter circuit for motor vehicles.

Referring now more particularly to the characters of reference on the drawing, the numeral 1 indicates the generator of a motor vehicle, and which generator is grounded on one side as at 2; the generator including a cut-out 3 interposed in the generator output lead 4 which extends to connection with an input terminal 5 of an ammeter 6. The output terminal 7 of ammeter 6 is connected to a wire 8 which leads to the negative pole 9 of a standard equipment 6 v. storage battery 10 whose positive pole is grounded as at 11. The above is a conventional generator circuit of a motor vehicle, and in combination with this generator circuit I incorporate my novel starter circuit.

The numeral 12 indicates an additional 6 v. storage battery which is mounted on the vehicle at any convenient point. A feed wire 13 leads from the output terminal 7 of ammeter 6 to connection with the negative pole 14 of battery 12, to a ground as at 17. The above I term the generator sub-circuit. Normally closed relay switches, indicated at 18 and 19, are interposed in feed wire 13 and ground wire 15; said switches including normally deenergized actuating coils indicated at 20 and 21 respectively. A fuse F is interposed in ground wire 15, as shown.

A manually actuated starter switch, indicated generally at 22 and which may be of the spring retracted push-button type, is mounted on the vehicle at a convenient point in the driver's compartment. This switch includes a contact 23 mounted in connection and adapted for movement with the push button, and such contact is grounded as at 24. The contact 23, upon initial advance of the push button, engages a double faced contact 24 mounted on one end of a leaf spring 25, and the contact 24 upon further movement of the push button engages a third and fixed contact 26. It will thus be seen that with advance of the push button, contacts 23 and 24 first engage, and are subsequently brought into circuit with contact 26, for the reasons as will hereinafter appear.

The coils 20 and 21 are included in a control sub-circuit formed in part by a wire 27 connected at one end with pole 9 of battery 10, and split at the other end into leads 27a and 27b which connect with one side of the coils 20 and 21. Another wire 28 is split at one end into leads 28a and 28b which connect with the other side of the coils 20 and 21, and the other end of wire 28 connects with the double faced contact 24 of the manually actuated switch 22.

The starter sub-circuit comprises a heavy-duty cable 29 connected between the negative pole 9 of battery 10 and the positive pole 16 of battery 12, and another heavy-duty cable 30 is connected between the negative pole of battery 12 and the input side of the starter motor 31, the latter being grounded at 32.

Normally open solenoid type starter switches, indicated at 33 and 34, are interposed in cables 29 and 30 respectively, the coils of said switches being normally deenergized and indicated at 35 and 36. It will be seen that upon closing of switches 33 and 34, a starter sub-circuit is established which connects batteries 10 and 12 in series relative to and with the starter motor 31.

The coils 35 and 36 are connected in another part of the control sub-circuit which comprises a lead 37 connected at one end with pole 9 of battery 10 and branched as at 37a and 37b, said branches being connected with one side of the coils 35 and 36. Another wire 38 is branched at one end as at 38a and 38b and said branches are connected with the other side of coils 35 and 36, respectively. The other end of wire 38 leads to and is connected with the fixed contact 26 of switch 22.

When the vehicle is in operation the switch 22 is open as to all its contacts; the switches 18 and 19, together with the generator cut-out switch are closed; and the starter sub-circuit switches 33 and 34 are open; all as shown in the figure of the drawing. When the vehicle stops and the engine is shut off, the parts remain in the same position as above, except that the generator cut-out switch 3 then automatically opens.

To actuate the motor 31 and start the vehicle motor, my improved starter circuit is brought into play as follows:

The push button 22 is depressed or advanced, which first effects engagement of contact 23 with contact 24, whereupon the coils 20 and 21 of the switches 18 and 19 are energized through the medium of wires 27 and 28, causing switches 18 and 19 to open. When the switches 18 and 19 open, this opens the circuit through wires 13 and 15 and cuts battery 12 out of the generator sub-circuit, i. e. breaks the parallel connection between battery 12 and battery 10; said generator sub-circuit having previously been opened immediately ahead of the generator by the generator cut-out switch 30 which functions when the engine of the vehicle is not running.

Thereafter with continued advance of the push button 22, engaged contacts 23 and 24 make circuit with contact 26, which results in the coils 35 and 36 of starter sub-circuit switches 33 and 34 being energized through wires 37 and 38, causing said switches 33 and 34 to close. With these switches closed the motor M is energized with 12 v., as the batteries 10 and 12 are then connected in series by cables 29 and 30.

As will be apparent, the initial closing of contacts 23 and 24, and the subsequent closing of engaged contacts 23 and 24 with contact 26 take place in sequence and rapidly following order upon a natural manual action of the push-button switch. However, this sequential closing is important as it permits the switches 18 and 19 to open a fraction of a second ahead of switches 33 and 34, and which is necessary to break the parallel connection of the batteries before the same are connected in series to supply 12 v. to motor 31.

While the ammeter 6 will indicate the full output of the generator 1, it is desirable that the amount of charge flowing to the battery 12 be separately indicated, and to this end I interpose another ammeter 39 in feed wire 13 ahead of switch 18.

From the foregoing description it will be readily seen that I have produced such a starter circuit for motor vehicles as substantially fulfills the objects of the invention as set forth herein.

While this specification sets forth in detail the present and preferred construction of the starter circuit, still in practice such deviations from such detail may be resorted to as do not form a departure from the spirit of the invention, as defined by the appended claims.

Having thus described my invention, what I claim as new and useful and desire to secure by Letters Patent is:

1. A starter circuit for a motor vehicle which includes a plurality of storage batteries, a generator, and a starter motor; said circuit comprising a generator sub-circuit in which said batteries are connected in parallel, a normally open starter motor sub-circuit in which the batteries are connected in series, and a control sub-circuit including a control switch unit, a normally closed deenergized relay interposed in each of the generator sub-circuit leads connected with one of the batteries, and a normally open deenergized relay interposed in each of the starter motor sub-circuit leads connected with the same battery; said switch unit being operative upon closing thereof to first energize the relays in the generator sub-circuit and to subsequently energize the relays in the starter motor sub-circuit.

2. A starter circuit for a motor vehicle which includes a plurality of storage batteries, a generator, and a starter motor; said circuit comprising a generator sub-circuit in which said batteries are connected in parallel, a normally open starter motor sub-circuit in which the batteries are connected in series, and a control sub-circuit including a control switch unit, a normally closed deenergized relay interposed in each of the generator sub-circuit leads connected with one of the batteries, and a normally open deenergized relay interposed in each of the starter motor sub-circuit leads connected with the same battery; the relays corresponding to each sub-circuit being wired in parallel with a lead extending to said switch unit, and said switch unit being operative to first cause energization of the relays in the generator sub-circuit, and to subsequently energize the relays in the starter motor sub-circuit.

3. A starter circuit for a motor vehicle which includes a plurality of storage batteries and a starter motor; said circuit comprising a starter motor sub-circuit which includes a lead connecting opposite poles of the batteries, another lead connecting the remaining pole of one battery with the starter motor, and a normally open deenergized relay interposed in each of said leads; and a switch actuated control circuit in which said relays are connected.

4. A starter circuit for a motor vehicle which includes a plurality of storage batteries, a generator, and a starter motor; said starter circuit comprising a generator sub-circuit which includes an output lead extending from the generator and having a generator cut-out switch interposed therein, said output lead being branched beyond the generator cut-out switch and said branches being connected to like poles of the batteries, ground leads connected with the other poles of the batteries, a normally closed deenergized relay interposed in the generator output lead branch corresponding to one battery, another normally closed deenergized relay interposed in the ground lead corresponding to the same battery; a normally open starter motor sub-circuit in which said batteries are connected in series; and a control sub-circuit operative to first energize said relays and then close the starter motor sub-circuit.

5. A starter circuit for a motor vehicle which includes a plurality of storage batteries, a generator, and a starter motor; said starter circuit comprising a generator sub-circuit which includes an output lead extending from the generator and having a generator cut-out switch interposed therein, said output lead being branched beyond the generator cut-out switch and said branches being connected to like poles of the batteries, ground leads connected with the other poles of the batteries, a normally closed deenergized relay interposed in the generator output lead branch and ground lead corresponding to one battery; a normally open starter motor sub-circuit which includes a battery lead connecting opposite poles of the batteries, another battery lead connecting the remaining pole of said one battery with the starter motor, and a normally open deenergized relay interposed in each of said battery leads; and a control sub-circuit operative to first energize the relays in the generator sub-circuit and to subsequently energize the relays in the starter motor sub-circuit.

6. A starter circuit for a motor vehicle which includes a plurality of storage batteries, a generator, and a starter motor; said starter circuit comprising a generator sub-circuit which includes an output lead extending from the generator and having a generator cut-out switch interposed therein, said output lead being branched beyond the generator cut-out switch and said branches being connected to like poles of the batteries, ground leads connected with the other poles of the batteries, a normally closed deenergized relay interposed in the generator output lead branch and ground lead corresponding to one battery; a normally open starter motor sub-circuit which includes a battery lead connecting opposite poles of the batteries, another battery lead connecting the remaining pole of said one battery with the starter motor, and a normally open deenergized relay interposed in each of said battery leads; and a control sub-circuit including separate leads adapted to be separately energized, one of said leads connecting the generator sub-circuit relays in parallel and another of said leads connecting the starter motor sub-circuit relays in parallel, and a manually controlled switch unit to which said separate leads connect, said switch unit being operative to first cause energization of said one lead and the generator sub-circuit relays, and to subsequently cause energization of another lead and the starter motor sub-circuit relays.

7. A starter circuit as in claim 6 in which said switch unit comprises three normally separate contacts; said leads being connected to separate ones of said contacts, the third contact being mounted to first close relative to one of said separate contacts and then close relative to the other of said separate contacts.

LINUS S. SNYDER.